United States Patent
Vanover

(10) Patent No.: US 6,951,326 B2
(45) Date of Patent: Oct. 4, 2005

(54) MAST SUPPORT

(76) Inventor: Scott Vanover, 1202 W. North B St., Tampa, FL (US) 33606

( * ) Notice: Subject to any disclaimer, the term of this patent is extended or adjusted under 35 U.S.C. 154(b) by 0 days.

(21) Appl. No.: 10/729,784

(22) Filed: Dec. 5, 2003

(65) Prior Publication Data

US 2005/0121590 A1 Jun. 9, 2005

(51) Int. Cl.⁷ .............................................. F16M 11/38
(52) U.S. Cl. ....................................... 248/170; 248/171
(58) Field of Search ............................ 248/440, 188.91, 248/188, 163.1, 432, 166, 165, 170, 168, 171

(56) References Cited

U.S. PATENT DOCUMENTS

| | | | | |
|---|---|---|---|---|
| 2,579,348 A | * | 12/1951 | Taylor | 248/178.1 |
| 4,317,552 A | * | 3/1982 | Weidler | 248/168 |
| 4,438,896 A | * | 3/1984 | Hall | 248/523 |
| 5,060,894 A | * | 10/1991 | Hillinger | 248/170 |
| 5,267,712 A | * | 12/1993 | Shen | 248/179.1 |
| 5,509,629 A | * | 4/1996 | Sassmannshausen et al. | 248/171 |
| 6,179,266 B1 | * | 1/2001 | Hutten | 248/465 |
| 6,322,027 B1 | * | 11/2001 | Hsu | 248/177.1 |
| 6,572,061 B2 | * | 6/2003 | Overbeck | 248/188.6 |
| 6,585,199 B1 | * | 7/2003 | Yu | 248/166 |
| 2003/0234327 A1 | * | 12/2003 | Nakatani | 248/177.1 |

FOREIGN PATENT DOCUMENTS

GB        2058557 A   *   4/1981   ........... F16M/11/24

* cited by examiner

Primary Examiner—Leslie A. Braun
Assistant Examiner—A. Joseph Wujciak
(74) Attorney, Agent, or Firm—Arthur W. Fisher, III

(57) ABSTRACT

A mast support to support a multi-section mast comprising a central mast support sleeve having a plurality of connector brackets extending outwardly from the outer surface thereof and a correspondingly plurality of support legs each pivotally coupled to the upper portion of the corresponding connector bracket and slidably coupled to the mid to lower portion of the corresponding connector member to permit the support legs to be selectively moved between a stored and deployed position and to advance successive mast sections through the central mast support sleeve from beneath or below the central mast support sleeve.

17 Claims, 4 Drawing Sheets

MAST SUPPORT

BACKGROUND OF THE INVENTION

1. Field of the Invention

A mast support to support a multi-section mast.

2. Description of the Prior Art

Numerous efforts have been made to design temporary or portable mast supports for use with mobile masts.

U.S. Pat. No. 5,308,029 describes a temporary mast stand for radio broadcasts erected for on site broadcasts and remote broadcasts, comprising a collapsible mast stand and a mast including a series of sections which are engaged and slidably raised through the bottom of tripod.

U.S. Pat. No. 5,435,509 relates to a similar mast stand for radio broadcasts wherein the bottom of a tripod includes extendible legs.

U.S. Pat. No. 6,450,464 shows a satellite dish stand including a transportable base for mounting a satellite dish. The satellite dish stand includes a pipe member with a lumen extending between an upper end and a lower end. A upper collar and a lower collar are coupled to the pipe member wherein a plurality of leg members is coupled to the upper collar and a plurality of leg support struts extend between the lower collar and a corresponding leg member.

U.S. Pat. No. 4,785,592 relates to multiple element mast and a method of raising the multiple element mast by adding and raising successive mast elements with a movable support plate.

U.S. Pat. No. 1,795,747 shows a tripod having collapsible legs with three telescoping members slidable supported by the collapsible legs, means for fastening the members rigidly together in any desired position, means for gradually releasing the fastening means, means for automatically restoring the members to their normal extended positions from full telescoped position and means for limiting the movement of the members upwardly.

U.S. Pat. No. 1,517,825 teaches a tripod that includes a central tube to receive a stem or post slides. The top the tube includes a ring fixed thereto to which the legs are pivoted. The legs comprise sections adapted to be clamped by screws. Each leg is connected to a collar means of a pivoted link, slidable up and down on the tube and provided with a clamp device to hold the adjustment. This construction permits the legs to be folded up against the tube for convenient transportation or to be extended and fastened to form a stand.

U.S. Pat. No. 2,194,800 relates to a clamping device for use on portable tripods for the support of cameras, surveying instruments, telescopes and the like.

U.S. Pat. No. 4,095,231 teaches a base station radio mast comprising a bracket having a first section for attachment to a support structure and a second section for receiving mast whips. The mast whip extending upwardly from a central opening in the second section of the bracket.

U.S. Pat. No. 1,879,865 relates to foldable music stand that allows a folding of the stand into a compact form for conveniently carrying the same in a casing.

U.S. Pat. No. 3,313,505 describes a collapsible stand comprising an upright member, at least three legs secured to the upright member above the lower end thereof and extending outwardly and downwardly therefrom. The lower ends of the legs are disposed below the lower end of the upright member, a flexible elongated brace means interconnect each of the legs and the upright member to brace the legs relative to the upright member and each leg relative to adjacent legs.

U.S. Pat. No. 2,845,243 relates to mounts for television or radio masts comprising a vertically extending upwardly opening pipe socket adapted to receive a mast, a plurality of downwardly divergent legs detachably secured to the pipe socket, brace means extending between the legs and the lower end of the pipe socket, and adjustable feet or clips carried by the lower divergent ends of the legs for adapting the mount for installation on variously pitched roofs.

German patent 68984, French patent 2,527,280 and U.S. Pat. Nos. 1,099,505, 1,900,354, 4,625,937 and 3,110,368 also refer to the prior art.

SUMMARY OF THE INVENTION

The present invention relates to a mast stand comprising a mast support to support a multi-section mast having a mast coupled thereto and a plurality of leg members coupled to the mast support.

The mast support comprises a central mast support sleeve including a mast receiving channel having a plurality of connector brackets to operatively couple a corresponding leg member to the mast support.

Each connect bracket comprises at least one bracket member extending outwardly from the central mast support comprising a plate having a coupling aperture formed therethrough to receive an upper leg coupling member to pivotally couple the upper portion of the corresponding leg member thereto and a guide or slot to slidingly receive a bracket coupling member therethrough connected to one end portion of a leg/bracket interconnecting member having the opposite end portion thereof pivotally coupled to the corresponding leg member by a lower coupling member. A lock member is removeably attached to the lower end portion of the mast support to support and retain the lower portion of the lower most mast section therein when the mast stand and the multi-section mast is assembled and deployed.

To use, each leg member is pivoted outwardly on the corresponding upper leg coupling member as the corresponding leg/bracket coupling member pivots downwardly on the corresponding lower coupling member such that the corresponding coupling member slides downwardly in the corresponding guide or slot.

Once the mast stand is deployed, the upper most mast section held in the mast receiving channel while a second mast section is moved upward into mast receiving channel to engage the upper most mast section and operatively coupled. This procedure or process is repeated until the mast is elevated to the desired height. The lock member is then secured to mast support to retain the lower portion of the lower most mast section in mast receiving channel.

To collapse and store the mast stand and multi-section mast is simply reversed.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
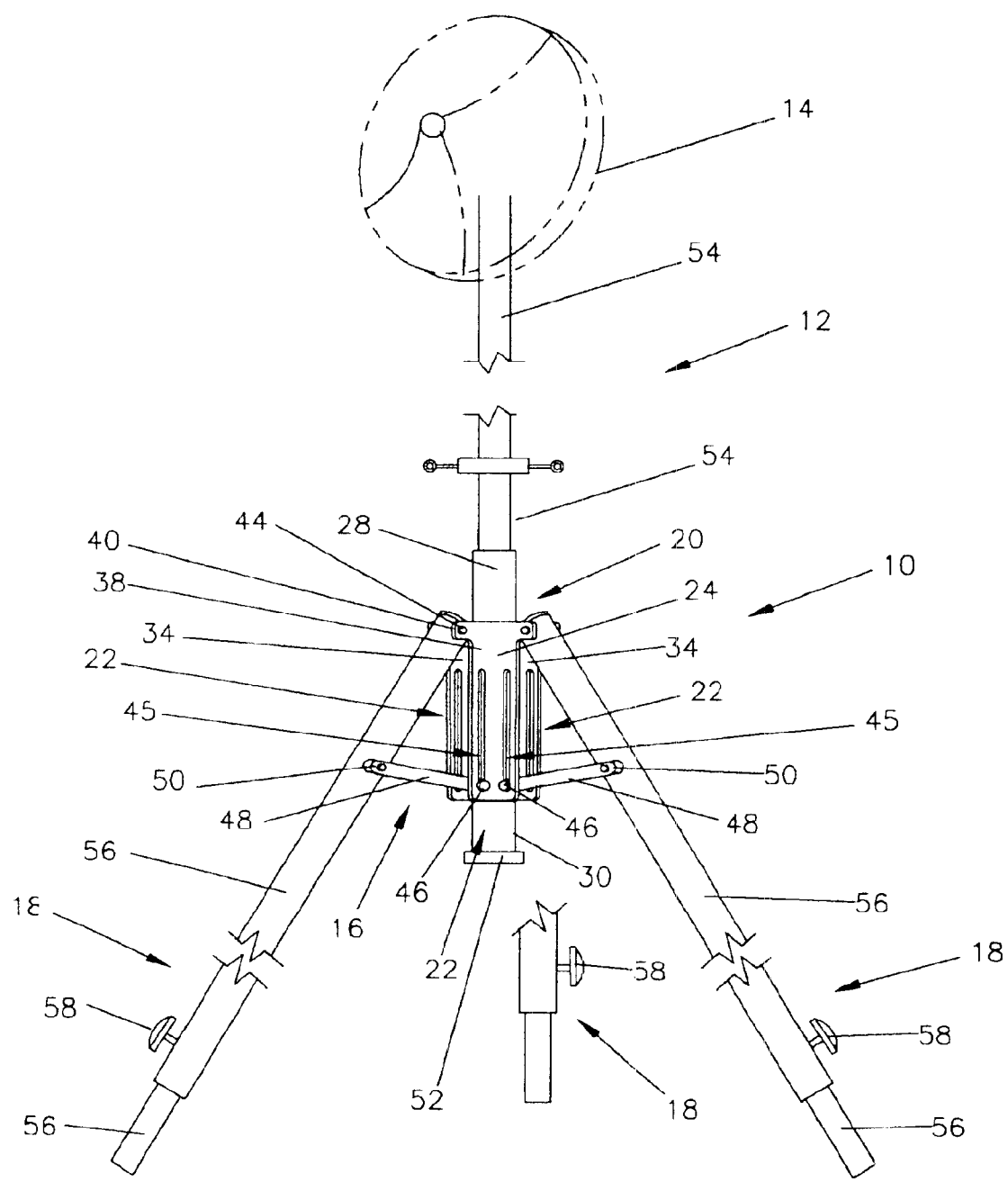
FIG. 1 is a view of the mast stand of the present invention fully deployed supporting a multi-section mast.
Figure 2:
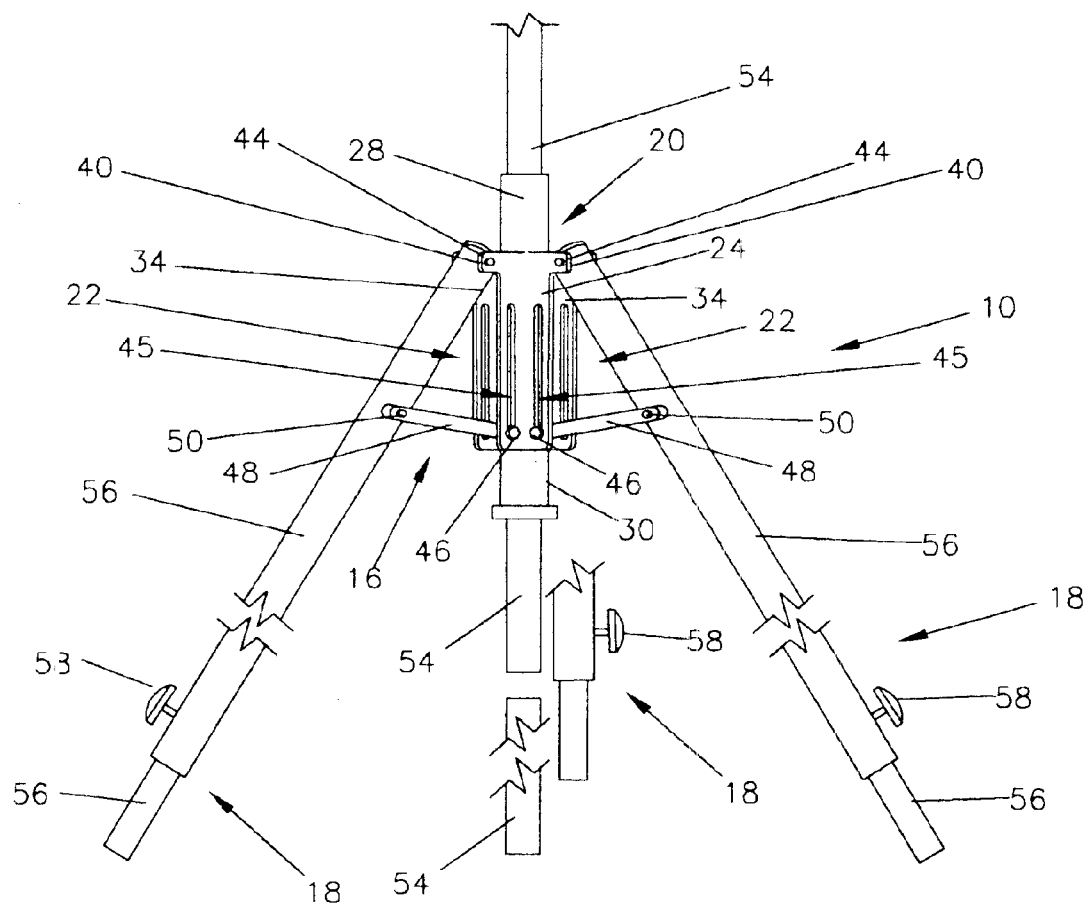
FIG. 2 is a view of the mast stand of the present invention fully deployed and with the multi-section mast partially assembled.
Figure 3:
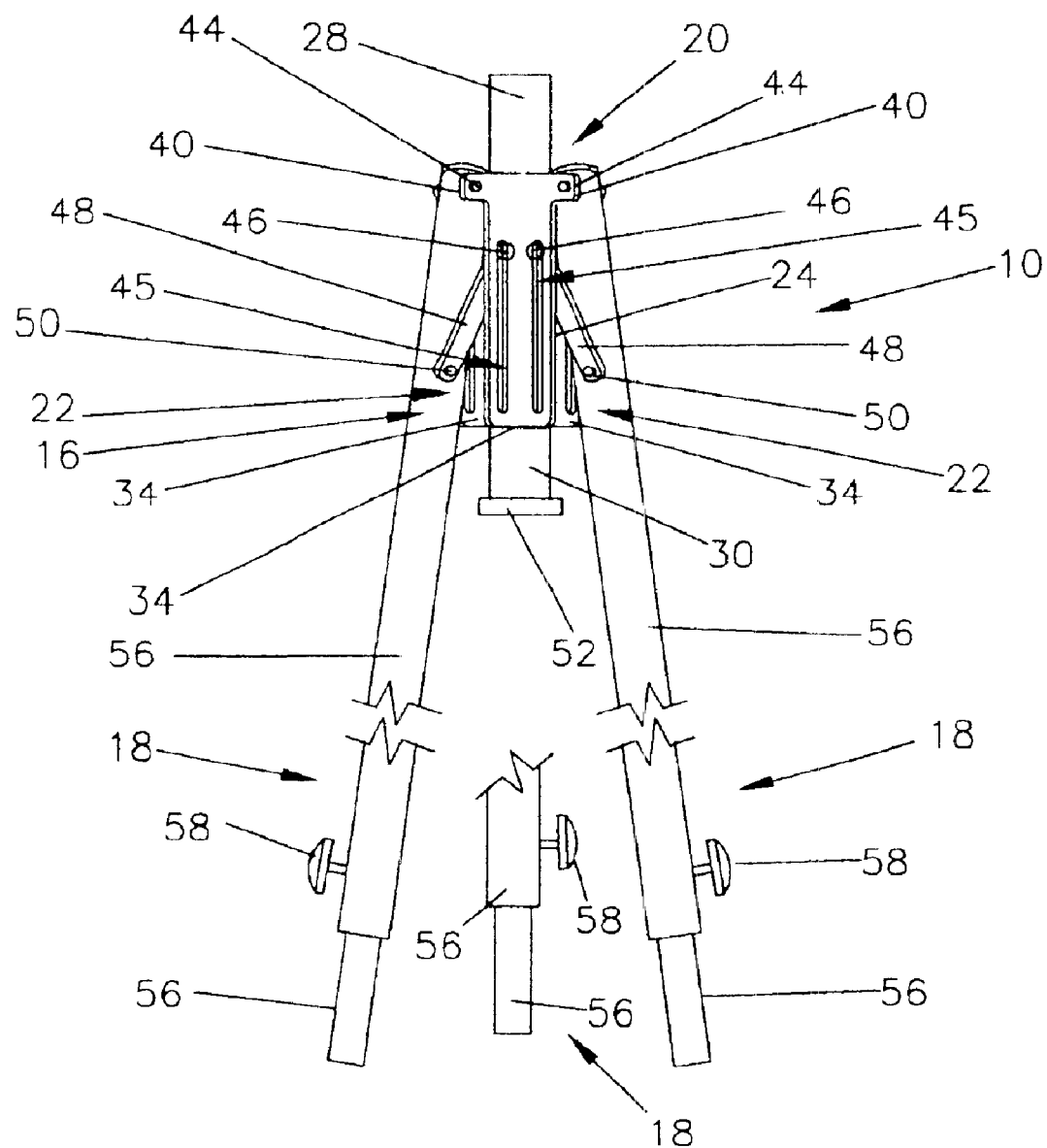
FIG. 3 is a view of the mast stand of the present invention in a partially collapsed position.
Figure 4:
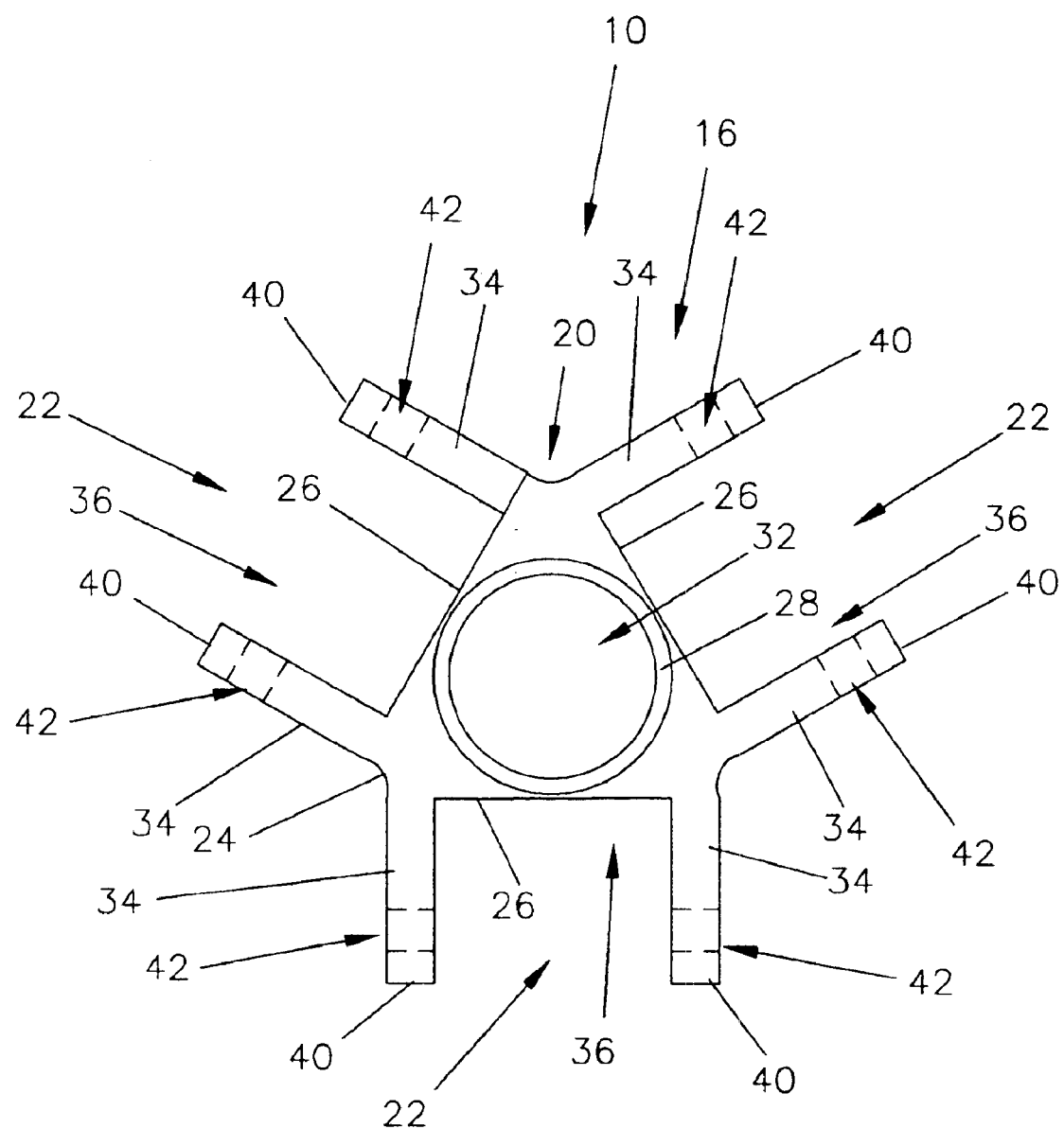
FIG. 4 is a top view of the mast support of the mast stand of the present invention.

As shown in FIGS. 1 through 4, the present invention relates to a mast stand generally indicated as 10 to support a multi-section mast generally indicated as 12 having an antenna 14 coupled thereto.

Of course, other devices such as cameras, sensors and the like can be mounted on the multi-section mast.

The mast stand 10 comprises a mast support generally indicated as 16 and a plurality of leg members each generally indicated as 18 coupled thereto.

The mast support 16 comprises a central mast support sleeve generally indicated as 20 having a plurality of connector brackets each generally indicated as 22 to operatively couple a corresponding leg member 18 to the mast support 16.

The mast support 16 comprises a substantially rectilinear mid-portion 24 including three substantially flat outer surfaces each indicated as 26, a substantially cylindrical upper end portion 28 and an externally threaded substantially cylindrical lower end portion 30 disposed on opposite end portions thereof to cooperatively form a substantially cylindrical elongated mast receiving channel 32 to receive and support a portion of the multi-section mast 12 therein.

Each connect bracket 22 comprises a pair of substantially parallel spaced apart bracket members each generally indicated as 34 extending outwardly from a correspondingly substantially flat outer surface 26 to cooperatively form a leg receiving channel 36 therebetween to selectively receive a portion of a corresponding leg member 18 therein when the mast stand 10 is in the stored or collapsed. Each bracket member 34 comprises a substantially flat plate 38 including a coplanar coupling protrusion or member 40 on the upper end portion thereof having a coupling aperture 42 formed therethrough to receive an upper pin or leg coupling member 44 to pivotally couple the upper portion of the corresponding leg member 18 between the corresponding pair of substantially parallel spaced apart bracket members 34 of the corresponding connector bracket 22 and a guide or slot 45 formed through the substantially flat plate 38 to slidingly receive a pin or bracket coupling member 46 therethrough connected to one end portion of a leg/bracket interconnecting member 48 having the opposite end portion thereof pivotally coupled to the corresponding leg member 18 by a lower pin or leg coupling member 50 in spaced relationship below the corresponding upper coupling member 44. The distance between the upper pin or leg coupling member 44 and the corresponding leg pin or leg coupling member 50 is greater than the length of the corresponding leg/bracket coupling member 48 which is greater than the length of the corresponding guide or slot 45. An internal threaded lock member 52 is threadably attached to the externally threaded substantially cylindrical lower end portion 28 of the mast support 16 to support and retain the lower portion of the lower most mast section 54 therein when the mast stand 10 and the multi-section mast 12 are assembled and deployed.

Each leg member 18 comprises a plurality of leg member sections each indicated as 56 disposed end to end or telescoping such that the distance between the externally threaded lower substantially cylindrical end portion 28 and the ground or other support surface is greater than the length of the lower mast mast sections 54 to allow erecting or assembling the multi-section mast 12 from below the mast support 16 by inserting successive mast sections 54 into the substantially cylindrical elongated mast receiving channel 32. Of course, each leg member 18 may be long enough to accommodate the mast sections 54 without the multiple leg member sections 56. A locking or securing member 58 such as a set screw is used to secure the corresponding leg sections 56 in place.

To use, each leg member 18 is pivoted outwardly on the corresponding upper pin or leg coupling member 44 as the corresponding leg/bracket coupling member 48 pivots downwardly on the corresponding lower pin or leg coupling member 50 such that the corresponding pin or bracket coupling member 46 slides downwardly in the corresponding guide or slot 45 until each pin or bracket coupling member 46 is disposed below the corresponding lower pin or leg coupling member 50 in the horizontal plane at the lower end portion of the coupling guide or slot 45.

Once the mast stand 10 is deployed, the upper most mast section 54 with the mast 14 attached thereto is held in the substantially cylindrical elongated mast receiving channel 32 from below or beneath the mast support 16 while a second mast section 54 is moved upward into the substantially cylindrical elongated mast receiving channel 32 to engage the upper most mast section 54 and operatively coupled. This procedure or process is repeated until the mast 14 is elevated to the desired height. The internally threaded lock member 52 is then secured to the externally threaded substantially cylindrical lower end portion 30 of the mast support 16 to retain the lower portion of the lower most mast section 54 in the substantially cylindrical elongated mast receiving channel 32. Of course, other means or structure may be employed to secure the multi-section mast 12 and the mast 14 in place.

To collapse and store the mast stand 10 and multi-section mast 12 is simply reversed. It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described:

What is claimed is:

1. A mast support to support a multi-section mast comprising a mast support including an outer surface having a plurality of connector brackets extending outwardly from said outer surface thereof and a correspondingly plurality of support legs each pivotally coupled to the upper portion of said corresponding connector bracket and slidably coupled to the mid to lower portion of said corresponding connector bracket to permit said support legs to be selectively moved between a stored and deployed position and to advance successive mast sections through said mast support from beneath or below said mast support wherein said mast support comprises a plurality of substantially flat outer surfaces corresponding to said plurality of connector brackets having an elongated mast receiving channel to receive and support a portion of the multi-section mast therein and each said connector bracket comprises a pair of substantially parallel spaced apart bracket members extending outwardly from the correspondingly substantially flat outer surface to cooperatively form a leg receiving channel therebetween to selectively receive a portion of a corresponding leg member therein when said mast stand is in the stored position and wherein each said bracket member comprises a substantially flat plate including a coplanar coupling protrusion on the upper end portion thereof having a coupling aperture formed therethrough to receive an upper coupling member to pivotally couple the upper portion of the corresponding leg member between the corresponding pair of substantially parallel spaced apart bracket members of the corresponding connector bracket and a guide or slot formed through said substantially flat plate which slidingly receive a bracket coupling member therethrough, wherein the bracket coupling member having one end portion connected to a leg/bracket interconnecting member and having the opposite end portion thereof pivotally coupled to a corresponding leg member via a lower leg coupling member in spaced relationship below the corresponding upper coupling member.

2. The mast support of claim 1 wherein the distance between said upper coupling member and said corresponding lower leg coupling member is greater than the length of said corresponding leg/bracket coupling member.

3. The mast support of claim 2 wherein the length of said corresponding leg/bracket coupling member is greater than the length of the corresponding guide or slot.

4. The mast support of claim 1 further including an end cap selectively mounted to the end portion of said mast support to support and retain the lower portion of the lower most mast section therein when said mast stand and the multi-section mast are assembled and deployed.

5. The mast support of claim 1 wherein each said leg member comprises a plurality of leg member sections disposed end to end such that the distance between said mast support and the ground or other support surface is greater than the length of the lower mast sections to allow assembling of the mum-section mast from below said mast support by inserting successive mast sections into said substantially cylindrical elongated mast receiving channel.

6. A mast support to support a multi-section mast comprising a mast support having a plurality of connector brackets thereon and a correspondingly plurality of support legs each pivotally coupled to the corresponding connector bracket and slidably coupled to the corresponding connector bracket to permit said support legs to be selectively moved between a stored and deployed position and to advance successive mast sections through said mast support from beneath or below said mast support wherein said mast support comprises a plurality of substantially flat outer surfaces corresponding to said plurality of connector brackets having an elongated mast receiving channel to receive and support a portion of the multi-section mast therein and each said connector bracket comprises a pair of substantially parallel spaced apart bracket members extending outwardly from the correspondingly substantially flat outer surface to cooperatively form a leg receiving channel therebetween to selectively receive a portion of a corresponding leg member therein when said mast stand is in the stored position and wherein each said bracket member including an upper end portion comprises a substantially fiat plate including a coplanar coupling protrusion on said upper end portion thereof having a coupling aperture formed therethrough to receive an upper coupling member to pivotally couple the upper portion of the corresponding leg member between the corresponding pair of substantially parallel spaced apart bracket members of the corresponding connector bracket and a guide or slot formed through said substantially flat plate which slidingly receive a bracket coupling member therethrough, wherein the bracket coupling member having one end portion connected to a leg/bracket interconnecting member and having the opposite end portion thereof pivotally coupled to a corresponding leg member via a lower leg coupling member in spaced relationship below the corresponding upper coupling member.

7. The mast support of claim 6 wherein the distance between said upper coupling member and said corresponding lower leg coupling member is greater than the length of said corresponding leg/bracket coupling member.

8. The mast support of claim 7 wherein the length of said corresponding leg/bracket coupling member is greater than the length of the corresponding guide or slot.

9. In mast support of claim 6 further including an end cap selectively mounted to the end portion of said mast support to support and retain the lower portion of the lower most mast section therein when said mast stand and the multi-section mast are assembled and deployed.

10. The mast support of claim 6 wherein each said leg member comprises a plurality of leg member sections disposed end to end such that the distance between said mast support and the ground or other support surface is greater than the length of the lower mast sections to allow erecting or assembling of the multi-section mast from below said mast support by inserting successive mast sections into said substantially cylindrical elongated mast receiving channel.

11. The mast support of claim 6 wherein said mast support comprises a sleeve having an elongated mast receiving channel formed therethrough to receive and support a portion of the multi-section mast therein.

12. The mast support of claim 11 wherein each said connect bracket comprises at least one bracket member extending outwardly from said sleeve to selectively receive a portion of a corresponding leg member therein when said mast stand is in the stored position.

13. A mast support to support a multi-section mast comprising a mast support having a plurality of connector brackets thereon and a correspondingly plurality of support legs each pivotally coupled to the corresponding connector bracket and slidably coupled to the corresponding connector bracket to permit said support legs to be selectively moved between a stored and deployed position and to advance successive mast sections through said mast support from beneath or below said mast support wherein said mast support comprises a sleeve having an elongated mast receiving channel formed therethrough to receive and support a portion of the multi-section mast therein and each said connector bracket comprises at least one bracket member extending outwardly from said sleeve to selectively receive a portion of a corresponding leg member therein when said mast stand is in the stored position and wherein each said bracket member comprises a plate including a coupling aperture formed therethrough to receive an upper coupling member to pivotally couple the upper portion of the corresponding leg member between the corresponding bracket member and a guide of slot formed through said plate to slidingly receive a bracket coupling member therethrough connected to one end portion of a leg/bracket interconnecting member having the opposite end portion thereof pivotally coupled to a corresponding leg member by a lower leg coupling member in spaced relationship below the corresponding upper coupling member.

14. The mast support of claim 13 wherein the distance between said upper coupling member and said corresponding lower leg coupling member is greater than the length of said corresponding leg/bracket coupling member.

15. The mast support of claim 14 wherein the length of said corresponding leg/bracket coupling member is greater than the length of the corresponding guide or slot.

16. The mast support of claim 13 further including an end cap selectively mounted to the end portion of said mast support to support and retain the lower portion of the lower most mast section therein when said mast stand and the multi-section mast are assembled and deployed.

17. The mast support of claim 16 wherein each said leg member comprises a plurality of leg member sections disposed end to end such that the distance between said mast support and the ground or other support surface is greater than the length of the lower mast sections to allow erecting or assembling of the multi-section mast from below said mast support by inserting successive mast sections into said substantially cylindrical elongated mast receiving channel.

* * * * *